United States Patent [19]

Hain

[11] Patent Number: 5,749,685

[45] Date of Patent: May 12, 1998

[54] ADJUSTABLE SECURING APPARATUS

[76] Inventor: Ronald J. Hain, 213 Mtn View, Anaconda, Mont. 59711

[21] Appl. No.: 822,341

[22] Filed: Mar. 20, 1997

[51] Int. Cl.⁶ .................................................... B60P 7/08
[52] U.S. Cl. ...................... 410/7; 410/3; 410/4; 280/511
[58] Field of Search .................................. 410/3, 4, 7, 8, 410/9, 19, 22, 77, 80; 280/511, 512, 304.1; 248/500, 503, 510; 224/403

[56] References Cited

U.S. PATENT DOCUMENTS

| | | | |
|---|---|---|---|
| 1,443,913 | 1/1923 | Ellis | 410/4 X |
| 1,753,838 | 4/1930 | Seeley | 410/9 |
| 1,776,935 | 9/1930 | Snyder | 410/30 |
| 3,385,611 | 5/1968 | Silver | 280/511 X |
| 4,416,467 | 11/1983 | Bradley | 280/512 |
| 4,563,018 | 1/1986 | Stage et al. | 280/402 |
| 4,601,620 | 7/1986 | Bugger et al. | 410/22 |
| 4,623,289 | 11/1986 | Apostolos | 410/7 |
| 4,671,713 | 6/1987 | Lenkman | 410/7 |
| 4,805,954 | 2/1989 | Lazaroff | 410/7 X |
| 5,016,897 | 5/1991 | Kauffman | 410/7 X |
| 5,044,845 | 9/1991 | Baker, Jr. | 410/3 |
| 5,090,718 | 2/1992 | Kauffman | 410/7 X |
| 5,203,655 | 4/1993 | Persau | 410/3 |
| 5,205,574 | 4/1993 | Heath | 410/3 X |
| 5,429,286 | 7/1995 | Foust | 410/3 X |
| 5,607,270 | 3/1997 | Zimmerman | 410/3 |

FOREIGN PATENT DOCUMENTS

| | | | |
|---|---|---|---|
| 700968 | 12/1953 | United Kingdom | 410/3 |

Primary Examiner—Stephen Gordon

[57] ABSTRACT

A new adjustable securing apparatus comprising a frame having a strap, is securely mounted to the bed of a vehicle. The new adjustable securing apparatus further comprises a swing arm, which swing arm is mounted in hinged manner to the frame. The swing arm is thusly capable of swinging to an attachment position complementing the position of a trailer ball secured on the ATV, snowmobile, or other item being secured thereby. The swing arm further comprises a trailer ball coupler providing for attachment of the adjustable securing apparatus to the trailer ball secured on the ATV, snowmobile, or other item being secured. The swing arm further comprises an L-shaped extension providing for a threaded bolt mounted therethrough, which threaded bolt abuts the strap and provides for adjustment of the swing arm relative to the bed of the vehicle after the ATV, snowmobile, or other item is secured to the swing arm.

1 Claim, 2 Drawing Sheets

ADJUSTABLE SECURING APPARATUS

BACKGROUND OF THE INVENTION

1. Field of the Invention

The present invention relates to an adjustable securing apparatus and more particularly pertains to an adjustable securing apparatus for securing recreational vehicles such as ATV's and snowmobiles to the bed of a vehicle such as a truck or a cart.

2. Description of the Prior Art

The use of securing apparatus is known in the prior art. More specifically, securing apparatus heretofore devised and utilized for the purpose of securing and holding various loads to the bed of vehicles such as trucks or carts are known to consist basically of familiar, expected and obvious structural configurations, notwithstanding the myriad of designs encompassed by the prior art which have been developed for the fulfillment of countless objectives and requirements.

The present invention is directed to an improved adjustable securing apparatus for securing and holding recreational vehicles such as ATV's and snowmobiles safely and conveniently on the bed of a vehicle in a manner which is secure, economical and aesthetically pleasing.

U.S. Pat. No. 1,753,838 to Seeley describes an automobile holddown as a freight car accessory in the shipment of automobiles. More specifically, Seeley teaches securing anchor plates to the floor of the freight car having spaced sets of openings which permit enlarged or headed ends of U-shaped holddowns received therein, said U-shaped holddowns being engaged with the spring of the automobile.

U.S. Pat. No. 5,429,286 to Foust describes an apparatus for securing a cart to the bed of a vehicle. Foust teaches a first clamping apparatus having a top and a bottom, the top being formed into an "U" shape and the bottom being formed into an "L" shape. The bottom having an opening through which a bolt is inserted which bolt passes into the bed of the vehicle to secure the first clamping apparatus to the vehicle. The "U" shaped end is adapted to mate with a cart axle. A second clamping apparatus is attached to the bed of the vehicle and has a central locking portion and a handle attached to the locking portion. When the handle is lowered, the end portion is lowered in a locking position. The end portion further has an end configured to pass over a rear portion of the cart, clamping the cart in a secured position on the vehicle bed.

U.S. Pat. No. 4,805,954 to Lazaroff describes a clamping apparatus for releasably securing a wheelchair to a base, such as the floor of a vehicle. Lazaroff teaches a frame which is capable of being rigidly secured to the base and a movable clamp which is pivotally attached to the frame and capable of being moved between a wheelchair clamping position and a wheelchair release position. Power driven actuating means for moving the clamp between the clamping and the release positions is provided.

U.S. Pat. No. 1,776,935 to Snyder describes a shipping device particularly adapted for use in the shipping of motor vehicles in freight cars. Snyder teaches a chock for bracing the wheels of a vehicle comprising a wheel engaging member and a separate member removably attached to the wheel engaging member, having means thereon by which it may be secured to a supporting surface.

U.S. Pat. No. 4,671,713 to Lenkman describes a device for locking down a wheelchair or like device to a support structure having a fixed eyelet mounted thereon. Lenkman teaches an elongated assembly adjustable as to length and with spaced surfaces thereon for engaging and embracing spaced frame members on a wheelchair, and apparatus for applying force on the elongated assembly when engaged with wheelchair frame members to lock the wheelchair to the support structure.

The adjustable securing apparatus according to the present invention substantially departs from the conventional concepts and designs of the prior art, and in doing so, provides an apparatus primarily developed for the purpose of securing and holding recreational vehicles such as ATV's and snowmobiles safely and conveniently on the bed of a vehicle in a manner which is secure, economical and aesthetically pleasing.

Therefore, it can be appreciated that there exists a continuing need for a new apparatus primarily developed for the purpose of securing and holding recreational vehicles such as ATV's and snowmobiles safely and conveniently on the bed of a vehicle in a manner which is secure, economical and aesthetically pleasing. In this regard, the present invention substantially fulfills this need.

As illustrated by the background art, efforts are continuously being made in an attempt to develop devices for attaching and securing loads to the beds of vehicles safely and conveniently. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of component elements, with the use of a minimum number of functioning parts, at a reasonable cost to manufacture, and by employing only readily available materials.

SUMMARY OF THE INVENTION

In view of the foregoing disadvantages inherent in the prior art, the present invention provides a new and improved adjustable securing apparatus for securing and holding recreational vehicles such as ATV's and snowmobiles safely and conveniently on the bed of a vehicle in a manner which is secure, economical and aesthetically pleasing. As such, the general purpose of the present invention, which will be described subsequently in greater detail, is to provide a new adjustable securing apparatus which has all of the advantages of the prior art and none of the disadvantages.

The invention is defined by the appended claims with the specific embodiment shown in the attached drawings. For the purpose of summarizing the invention, the new adjustable securing apparatus comprises a frame which is securely mounted to the bed of a vehicle, said frame comprising two pieces of angle iron or other suitable material which are positioned parallel with one another in longitudinal arrangement with the bed of the vehicle and bolted or otherwise securely mounted to the bed of the vehicle. Attached to one or the other of the two pieces of angle iron or other suitable material is a strap which lies flat on the bed of the vehicle. The new adjustable securing apparatus further comprises a swing arm, which swing arm is mounted in hinged manner on a first end thereof between said two pieces of angle iron or other suitable material securely mounted to the bed of the vehicle. Said swing arm thusly being capable of swinging from said first end thereof from a resting position parallel with and on the bed of the vehicle to an attachment position complementing the position of a standard trailer ball secured on the ATV, snowmobile, or other item being secured thereby. Said swing arm further comprising a standard trailer ball coupler mounted on a second end thereof, said trailer ball coupler providing for attachment of the adjustable securing apparatus to the trailer ball secured on the ATV, snowmobile, or other item being secured. Said swing arm further comprising an L-shaped extension on said first end thereof, said L-shaped extension providing for a threaded bolt mounted therethrough, which threaded bolt provides for adjustment of said swing arm relative to the bed of the vehicle after the ATV, snowmobile, or other item is secured to said swing arm by abutting and being adjustable on the strap.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an adjustable supporting apparatus for safely securing and transporting a recreational vehicle such as an ATV or a snowmobile on the bed of a vehicle such as a truck or a trailer.

It is another object of the present invention to provide a new adjustable securing apparatus which may be easily and efficiently manufactured and marketed.

It is a further object of the present invention to provide a new adjustable securing apparatus which is of a durable and reliable construction.

An even further object of the present invention is to provide a new adjustable securing apparatus which is susceptible of a low cost of manufacture with regard to both materials and labor, and which accordingly is then susceptible of low prices of sale to the consuming public, thereby making such adjustable securing apparatus economically available to the buying public.

Still yet another object of the present invention is to provide a new adjustable securing apparatus which provides in the apparatus and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive means in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

IN THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, a new and improved adjustable securing apparatus 10 embodying the principles and concepts of the present invention will be described.

Figure 1:
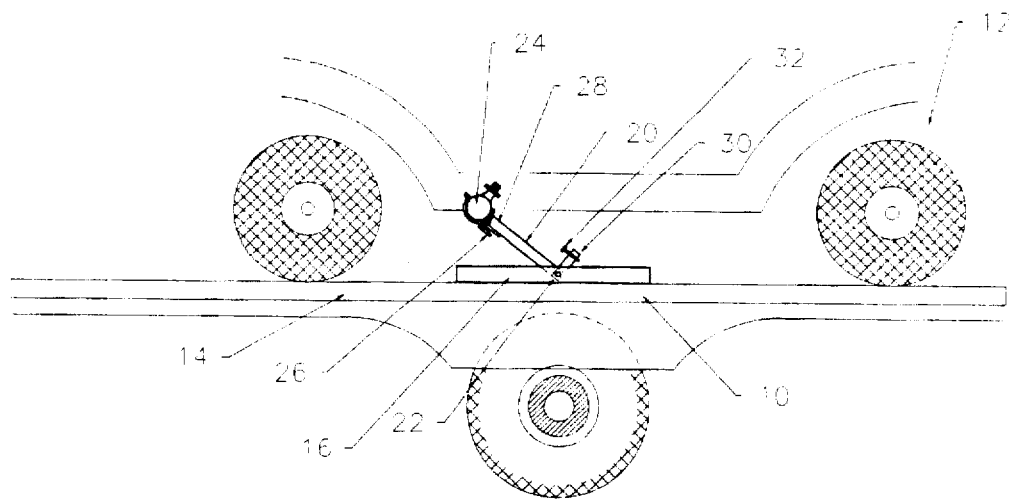
FIG. 1 is a side view of a new and improved adjustable securing apparatus according to the instant application as it would appear mounted on the bed of the vehicle securing an ATV.

From an overview standpoint, as shown in FIG. 1, the adjustable securing apparatus 10 is adapted for use for securing and holding recreational vehicles such as ATV's 12 and snowmobiles safely and conveniently on the bed 14 of a vehicle such as a truck or trailer in a manner which is secure, economical and aesthetically pleasing.

Figure 2:
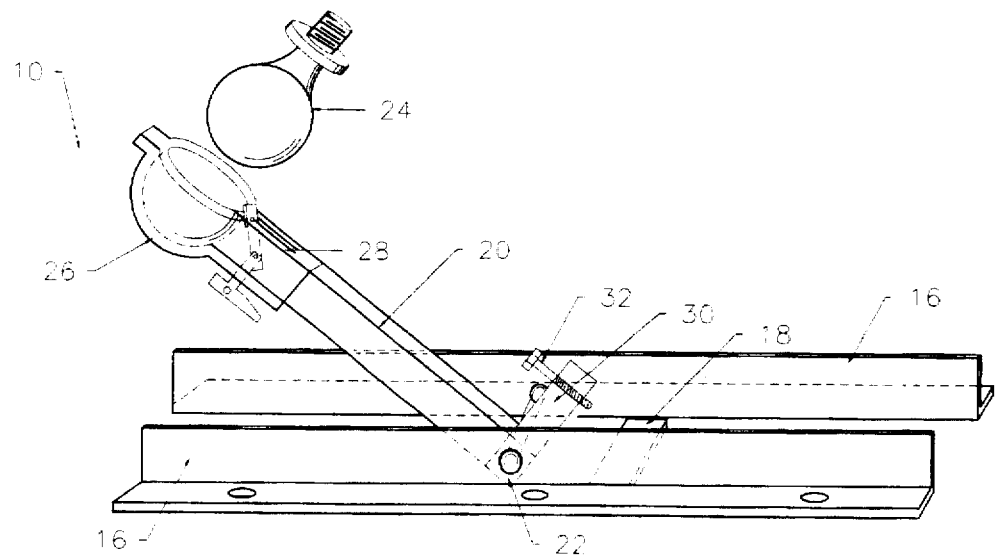
FIG. 2 is a perspective view of a new and improved adjustable securing apparatus of the present invention.
Figure 3:
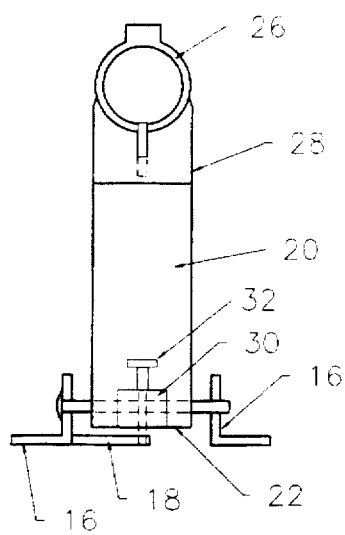
FIG. 3 is a front view of a new and improved adjustable securing apparatus of the present invention.
Figure 4:
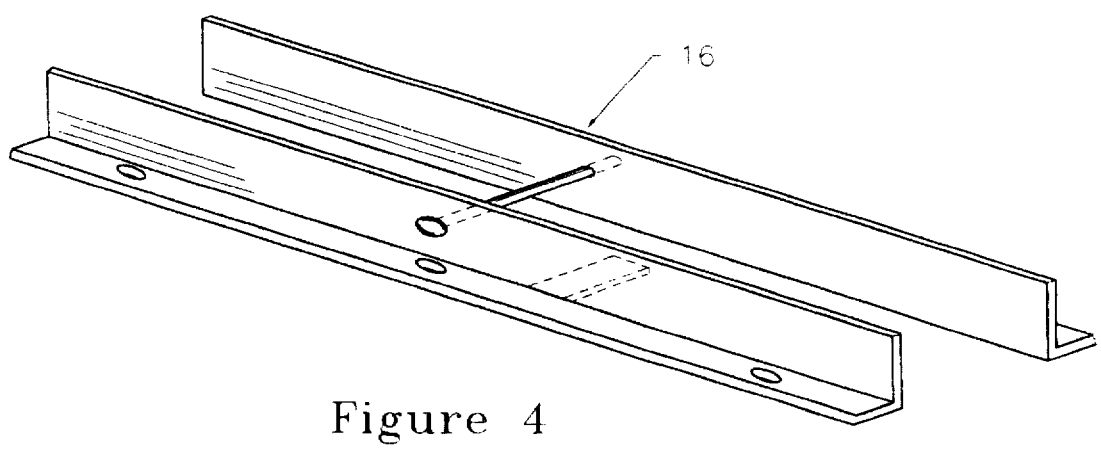
FIG. 4 is a perspective view of the frame of a new and improved adjustable securing apparatus of the present invention.

With reference now to FIGS. 2–4, it will be noted that a new adjustable securing apparatus 10 is shown. The new adjustable securing apparatus 10 comprises a frame 16, shown in FIG. 4, which is securely mounted to the bed 14 of the vehicle, said frame 16 comprising two pieces of angle iron or other suitable material which are positioned parallel with one another in longitudinal arrangement with the bed of 14 the vehicle and bolted or otherwise securely mounted to the bed 14 of the vehicle. Perpendicularly attached to one or the other of the two pieces of angle iron or other suitable material is a strap 18 which lies flat on the bed 14 of the vehicle. Said new adjustable securing apparatus 10 further comprises a swing arm 20, which swing arm is mounted in hinged manner on a first end 22 thereof between said two pieces of angle iron or other suitable material comprising said frame 16 securely mounted to the bed 14 of the vehicle. Said swing arm 20 thusly being capable of swinging from said first end 22 thereof from a resting position parallel with and on the bed 14 of the vehicle to an attachment position complementing the position of a standard trailer ball 24 secured on the ATV, snowmobile, or other item being secured thereby. Said swing arm 20 further comprising a standard trailer ball coupler 26 mounted on a second end 28 thereof, said trailer ball coupler 26 providing for attachment of the adjustable securing apparatus 10 to the trailer ball 24 secured on the ATV, snowmobile, or other item being secured. Said swing arm 20 further comprising an L-shaped extension 30 on said first end 22 thereof, said L-shaped extension 30 providing for a threaded bolt 32 mounted therethrough, which threaded bolt 32 provides for adjustment of said swing arm 20 relative to the bed 14 of the vehicle after the ATV, snowmobile, or other item is secured to said swing arm 20 by means of said threaded bolt 32 abutting and adjusting against said strap 18.

In operation, the adjustable securing apparatus 10 is securely mounted on the bed 14 of the vehicle with which the ATV, snowmobile, or other item is to be transported. The ATV, snowmobile, or other item to be transported, with a trailer ball 24 appropriately attached, is positioned over the adjustable securing apparatus 10. The swing arm 20 of the adjustable securing apparatus 10 is swung upward to a position whereby the trailer ball coupler 26 complements the position of the trailer ball 24 on the ATV, snowmobile, or other item being transported. The trailer ball 24 is secured within the trailer ball coupler 26 and the adjustment bolt 32 on the swing arm 20 is tightened to secure the ATV, snowmobile, or other item being transported to the bed 14 of the vehicle, thus adjustably securing the ATV, snowmobile, or other item being transported to the bed 14 of the vehicle in such manner that suspension of the ATV, snowmobile, or other item being transported is not compressed, yet the ATV, snowmobile, or other item being transported is prohibited from bouncing, rolling, or other movement on the bed 14 of the vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

While particular embodiments of the invention have been shown and described, it will be understood that the invention is not limited thereto, since modifications may be made that will become apparent to those skilled in the art.

What is claimed is:

1. An new adjustable securing apparatus in combination with a bed of a transport vehicle for use with a trailer ball secured on a vehicle to be transported, said adjustable securing apparatus comprising:

a frame;

said frame comprising two pieces of angle iron, said two pieces of angle iron being positioned parallel with one another in longitudinal arrangement on the bed of the transport vehicle and securely mounted to the bed of the transport vehicle via fastening means;

said frame comprising a strap, said strap being attached perpendicularly to one of said two pieces of angle iron and lying flat on the bed of the transport vehicle;

a swing arm, said swing arm having a first and a second end thereof;

said swing arm being mounted in a hinged manner on said first end thereof to and between said two pieces of angle iron;

said swing arm being capable of swinging from said first end thereof from a resting position parallel with and on the bed of the transport vehicle to a raised attachment position for engaging said trailer ball secured on the vehicle to be transported;

said swing arm having a trailer ball coupler mounted on said second end thereof, said trailer ball coupler providing for attachment to the trailer ball secured on the vehicle to be transported;

said swing arm having an L-shaped extension on said first end thereof; and, said L-shaped extension having a threaded bolt mounted therethrough, said threaded bolt providing for adjustment of said swing arm relative to the bed of the transport vehicle by abutting and adjusting against said strap after the vehicle to be transported is secured to said swing arm.

* * * * *